No. 687,347. Patented Nov. 26, 1901.
R. S. STAPLETON.
TRIPOD.
(Application filed May 11, 1901.)
(No Model.) 2 Sheets—Sheet 1.
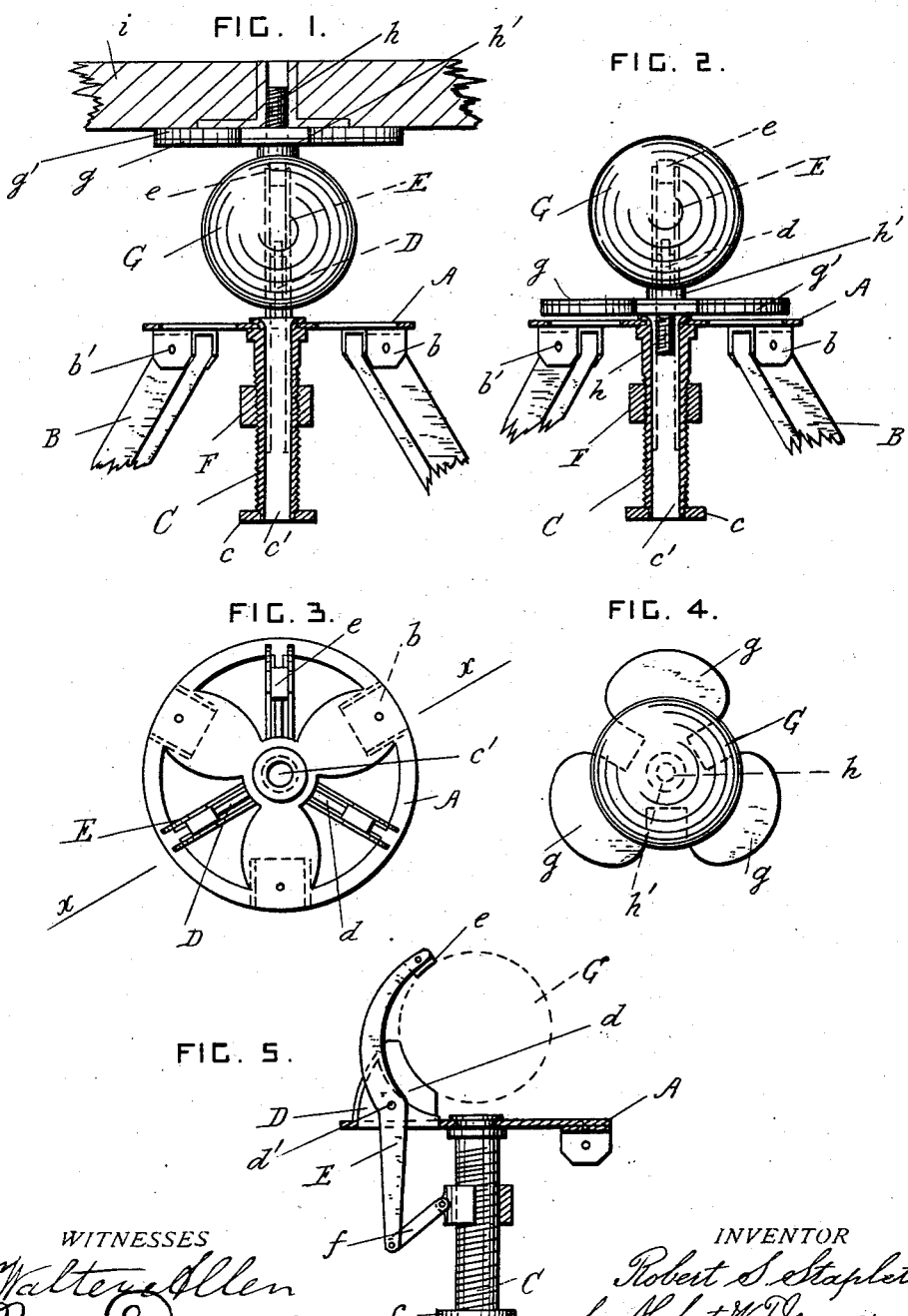
WITNESSES
INVENTOR
Robert S. Stapleton
by Herbert W. Jenner.
Attorney

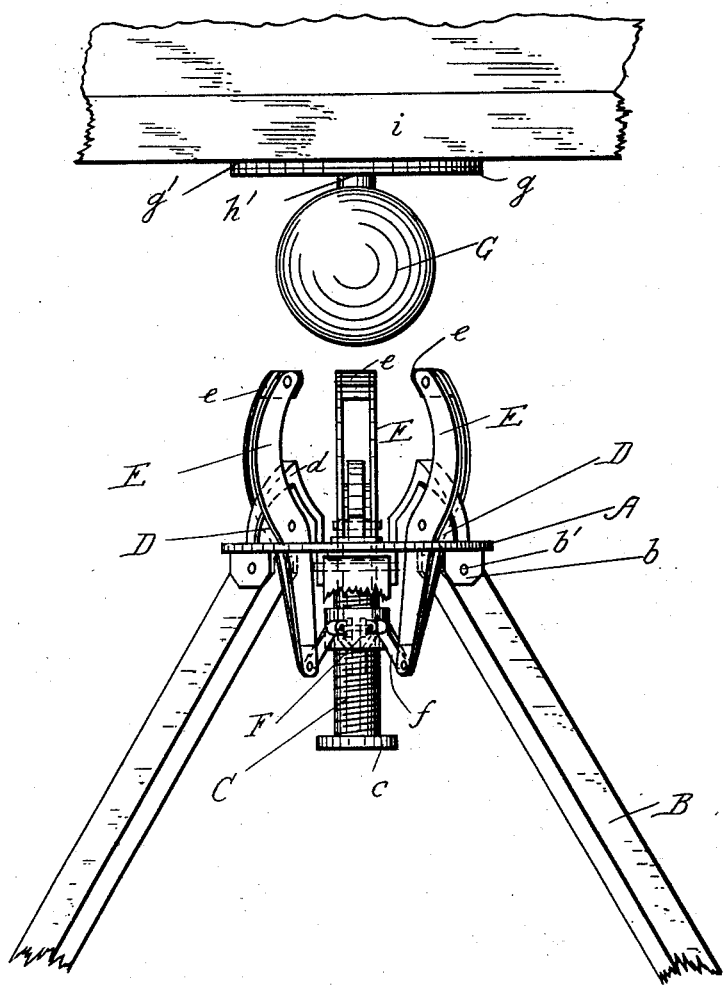

UNITED STATES PATENT OFFICE.

ROBERT S. STAPLETON, OF HANNAH, NORTH DAKOTA.

TRIPOD.

SPECIFICATION forming part of Letters Patent No. 687,347, dated November 26, 1901.

Application filed May 11, 1901. Serial No. 59,788. (No model.)

*To all whom it may concern:*

Be it known that I, ROBERT S. STAPLETON, a citizen of the United States, residing at Hannah, in the county of Cavalier and State of North Dakota, have invented certain new and useful Improvements in Tripods; and I do hereby declare the following to be a full, clear, and exact description of the invention such as will enable others skilled in the art to which it appertains to make and use the same.

This invention relates to tripods for cameras, surveyors' levels, and other similar instruments; and it consists in the novel construction and combination of the parts hereinafter fully described and claimed.

In the drawings, Figure 1 is a vertical section of the top part of a tripod constructed according to this invention, showing the parts in their working position. Fig. 2 is a similar view, but shows the ball reversed for carrying about. Fig. 3 is a plan view of the lower part of the socket. Fig. 4 is a plan view of the upper part of the socket. Fig. 5 is a vertical section on line $xx$ in Fig. 3. Fig. 6 is a side view of the ball and its socket.

A is a circular plate or disk, and $b$ represents brackets riveted to the under side of the plate and having the legs B of the tripod pivoted to them by pins $b'$.

C is a screw, the upper end of which is journaled in the center of the plate. This screw has a head or knob $c$ for revolving it, and it also has an axial hole $c'$.

D represents brackets formed of flaps struck up from the plate A in pairs, leaving openings in the plate, and $d$ represents curved cushions of soft material secured between the pairs of flaps. These brackets D are arranged at equal distances apart, and three brackets are preferably provided.

E represents levers which straddle the brackets D and which are pivoted on the pins $d'$, which pass through the brackets and which retain the cushions in position. Pads $e$ of soft material are secured to the upper ends of the levers E over the cushions.

F is a nut which works upon the screw C, and $f$ represents links which are pivoted to the said nut and to the lower ends of the levers E.

G is a ball provided with a screw-threaded stem $h$, having a collar $h'$. A bearing-plate having three lobes $g$ is journaled on the stem $h$ close to the collar, and the plate and its lobes are covered with a pad or pads of soft material $g'$. The stem $h$ is screwed into the bottom portion $i$ of the camera or other instrument, and the pads $g'$ bear against the said bottom and permit the ball to be screwed on firmly. The ball is placed on the curved cushions $d$, as shown in Fig. 1, and when the position of the camera has been adjusted the screw C is turned so that the pads $e$ are pressed against the upper part of the ball by means of the pivoted levers E, and the ball is thereby clamped in position. When the tripod is to be carried about, the ball is unscrewed from the camera and its screw-threaded stem is dropped into the central hole of the screw C with the lobes $g$ bearing on the plate A between the brackets D. The ball is then secured by operating the pivoted levers, and when held in this position it is protected from becoming lost or injured.

What I claim is—

1. The combination, with the top plate of a tripod, of a series of clamping-levers pivotally supported by the said plate and movable in vertical planes, a ball arranged between the upper parts of the said levers and provided with a fastening attachment, a central screw journaled in the said plate, and means connected to the lower end portion of the said levers below the said plate and engaged by the said screw for operating the said levers simultaneously to clamp the ball, substantially as set forth.

2. The combination, with the top plate of a tripod provided with brackets and cushions on its upper side, of levers pivoted to the said brackets and provided with pads over the said cushions, a screw journaled in the said plate and provided with a central hole, a ball provided with a fastening-stem which will enter the said hole when the ball is reversed, a nut on the said screw, and connections between the said nut and levers, substantially as set forth.

3. The combination, with the top plate of a tripod provided with supports for a ball on its upper side, of clamping-levers pivotally supported by the said plate, a screw journaled in the said plate, a nut engaging with the said screw, connections between the said nut and levers, and a ball arranged between the said supports and the upper end portions of the said levers and provided with a fastening attachment, substantially as set forth.

4. The combination, with the top plate of a tripod provided with projecting brackets formed of flaps and arranged in pairs, cushions arranged between the said brackets, pivoted levers which straddle the said brackets and cushions and have pads at their upper ends, means for operating the said levers, and a ball arranged between the said cushions and pads and provided with a fastening attachment, substantially as set forth.

5. The combination, with the top plate of a tripod provided with cushions, of a screw journaled in the said plate and provided with a central hole, levers pivotally supported by the said plate and having pads at their upper ends, a nut arranged on the said screw and connected with the said levers, a ball provided with a fastening-stem which will enter the said hole, and a bearing-plate provided with lobes which bear on the said plate between the said cushions when the ball is engaged by the said cushions and pads in its reversed position, substantially as set forth.

In testimony whereof I affix my signature in presence of two witnesses.

ROBERT S. STAPLETON.

Witnesses:
C. B. McMILLAN,
C. P. GETCHELL.